(12) United States Patent
Gurney et al.

(10) Patent No.: US 9,884,236 B2
(45) Date of Patent: Feb. 6, 2018

(54) REMOVABLE PADDLE ATTACHMENT DEVICE

(71) Applicants: Steven Douglas Gurney, Reston, VA (US); John Wesley Gurney, Great Falls, VA (US)

(72) Inventors: Steven Douglas Gurney, Reston, VA (US); John Wesley Gurney, Great Falls, VA (US)

( * ) Notice: Subject to any disclaimer, the term of this patent is extended or adjusted under 35 U.S.C. 154(b) by 0 days.

(21) Appl. No.: 14/849,090

(22) Filed: Sep. 9, 2015

(65) Prior Publication Data

US 2016/0069511 A1  Mar. 10, 2016

Related U.S. Application Data

(60) Provisional application No. 62/047,860, filed on Sep. 9, 2014.

(51) Int. Cl.
| | | |
|---|---|---|
| *A63B 67/00* | (2006.01) | |
| *B63H 16/04* | (2006.01) | |
| *B63B 35/85* | (2006.01) | |
| *F16B 2/08* | (2006.01) | |
| *A63B 67/06* | (2006.01) | |

(Continued)

(52) U.S. Cl.
CPC .......... *A63B 67/007* (2013.01); *A01K 15/025* (2013.01); *A63B 59/20* (2015.10); *A63B 60/38* (2015.10); *A63B 60/56* (2015.10); *A63B 67/06* (2013.01); *A63B 67/066* (2013.01); *A63H 33/18* (2013.01); *B63B 35/85* (2013.01); *B63H 16/04* (2013.01); *F16B 2/08* (2013.01); *A63B 49/00* (2013.01); *A63B 59/00* (2013.01); *A63B 59/50* (2015.10); *A63B 2102/065* (2015.10); *A63B 2102/14* (2015.10); *A63B 2102/18* (2015.10); *A63B 2210/50* (2013.01); *A63B 2225/60* (2013.01); *A63B 2225/605* (2013.01)

(58) Field of Classification Search
CPC ............................... A63B 67/007; A47B 96/06
USPC .......... 473/513, 515, 466, 510, 511; 24/457, 24/300, 301; 248/230.8, 229.17, 313
See application file for complete search history.

(56) References Cited

U.S. PATENT DOCUMENTS

| | | | | |
|---|---|---|---|---|
| 4,256,281 A | * | 3/1981 | Harris .................... | B60N 3/103 224/414 |
| 5,833,188 A | * | 11/1998 | Studdiford ............... | B62J 11/02 248/229.17 |

(Continued)

*Primary Examiner* — Melba Bumgarner
*Assistant Examiner* — Rayshun Peng
(74) *Attorney, Agent, or Firm* — Dunlap Bennett & Ludwig PLLC

(57) ABSTRACT

A removable paddle attachment assembly is provided. The attachment assembly may include a attachment bracket terminating at opposing saddles, a handle saddle for engaging a first portion of a watercraft paddle and an activity saddle for engaging an activity device, whereby the activity device is removably yet rigidly secured to the watercraft paddle so that the activity device may be employed for game-playing and/or exercise-training purposes, while not impairing the performance and functionality of the watercraft paddle. The attachment bracket provides at least one attachment strap cleat so that a attachment strap may be stretched from one lateral surface of the attachment bracket to an opposing lateral surface thereof, thereby securely sandwiching the first and a second portion of the watercraft paddle against the handle saddle.

17 Claims, 5 Drawing Sheets

(51) Int. Cl.
*A63H 33/18* (2006.01)
*A63B 60/56* (2015.01)
*A63B 60/38* (2015.01)
*A63B 59/20* (2015.01)
*A01K 15/02* (2006.01)
*A63B 49/00* (2015.01)
*A63B 59/00* (2015.01)
*A63B 102/14* (2015.01)
*A63B 102/06* (2015.01)
*A63B 102/18* (2015.01)
*A63B 59/50* (2015.01)

(56) References Cited

U.S. PATENT DOCUMENTS

2005/0143202 A1* 6/2005 Orlowski ............... A63B 65/12
  473/509
2010/0282381 A1* 11/2010 Badertscher ........ E05B 73/0005
  150/159
2013/0181022 A1* 7/2013 Bogoslofski ............. A45F 5/00
  224/250

* cited by examiner

REMOVABLE PADDLE ATTACHMENT DEVICE

CROSS-REFERENCE TO RELATED APPLICATION

This application claims the benefit of priority of U.S. provisional application Ser. No. 62/047,860, filed 09, Sep. 2014, the contents of which are herein incorporated by reference.

BACKGROUND OF THE INVENTION

The present invention relates to watercraft accessories and, more particularly, to a removable paddle attachment device embodying a method of modifying a watercraft paddle for training and game playing without compromising normal paddling technique.

The activities performed when paddling a watercraft are often limited to touring and fishing. There are very few if any games or training exercises that can be performed with the standard watercraft paddle.

Current game-playing or exercise-training devices that incorporate or are mounted to watercraft paddles have the following limitations: they are fully integrated with a separate paddle apparatus that a user must utilize instead of their preferred paddle; incorporation of such devices requires the user to employ a less then optimal paddle position when paddling; and/or such devices utilize the blade of the paddle, which can impede paddling and/or cause damage thereto.

As can be seen, there is a need for a removable paddle attachment device embodying a method of modifying a watercraft paddle for training and game playing, which only temporarily modifies a preferred paddle so as to not impede functionality and performance yet enables easy attachment and removal.

SUMMARY OF THE INVENTION

In one aspect of the present invention, an attachment assembly for removably securing an activity device to a watercraft paddle that includes at least one attachment bracket, each having an elongated body extending from an activity end to a handle end; a handle saddle formed along the handle end; a pair of opposing peripheral surfaces defining a periphery of the elongated body between the activity and handle ends; and at least one attachment strap cleat disposed along the pair of opposing peripheral surfaces; and an attachment strap for each attachment bracket, each attachment strap forming a plurality of strap holes along its length, wherein the attachment strap is dimensioned and adapted to be attached along one surface of the pair of opposing peripheral surfaces and stretch over the handle saddle so as to interface along the opposing surface of the pair of opposing peripheral surfaces, whereby a portion of the watercraft paddle may be sandwiched between each attachment strap and each handle saddle.

In another aspect of the present invention, attachment assembly for removably securing an activity device to a watercraft paddle without compromising paddling techniques includes two attachment brackets, each having an elongated body extending from an activity end to a handle end; a handle saddle formed along the handle end; a pair of opposing peripheral surfaces defining a periphery of the elongated body between the activity and handle ends; and at least one attachment strap cleat disposed along the pair of opposing peripheral surfaces; and an attachment strap for each attachment bracket, each attachment strap forming a plurality of strap holes along its length, wherein the attachment strap is dimensioned and adapted to be attached along one surface of the pair of opposing peripheral surfaces and stretch over the handle saddle so as to interface along the opposing surface of the pair of opposing peripheral surfaces, wherein each attachment saddle is connected to a portion of the activity device.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a removable paddle attachment assembly. The attachment assembly may include an attachment bracket terminating at opposing saddles, a handle saddle for engaging a first portion of a watercraft paddle and an activity saddle for engaging an activity device, whereby the activity device is removably yet rigidly secured to the watercraft paddle so that the activity device may be employed for game-playing and/or exercise-training purposes, while not impairing the performance and functionality of the watercraft paddle. The attachment bracket provides at least one attachment strap cleat so that an attachment strap may be stretched from one lateral surface of the attachment bracket to an opposing lateral surface thereof, thereby securely sandwiching the first and a second portion of the watercraft paddle against the handle saddle.

Figure 1:
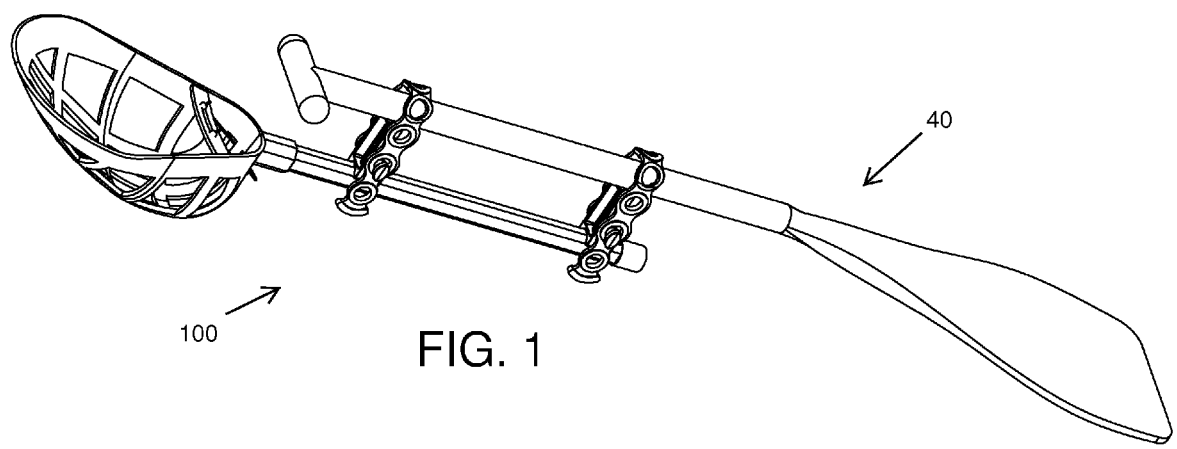
FIG. 1 is a perspective view of an exemplary embodiment of the present invention.
Figure 2:
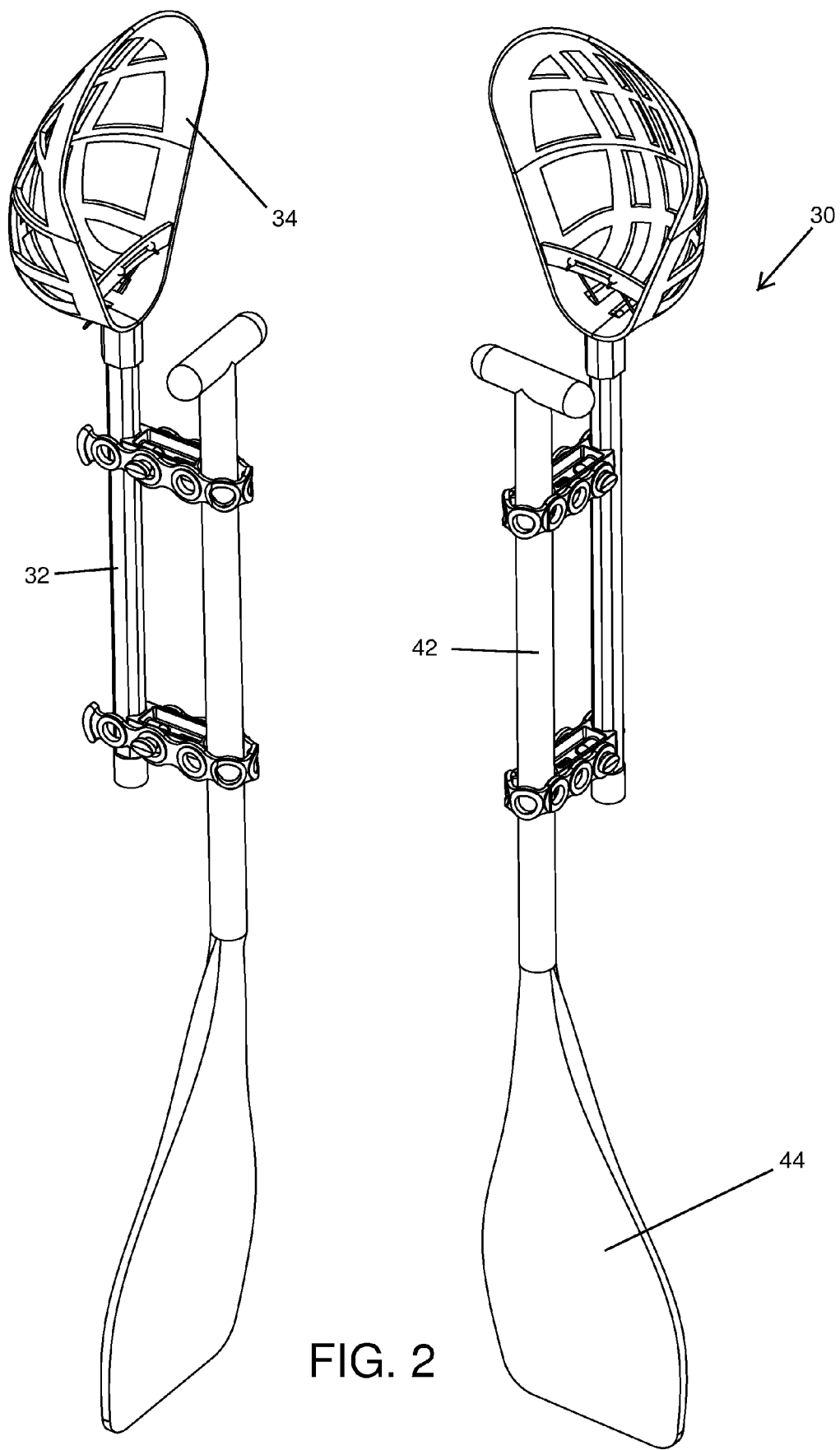
FIG. 2 is a perspective view of an exemplary embodiment of the present invention.
Figure 3:
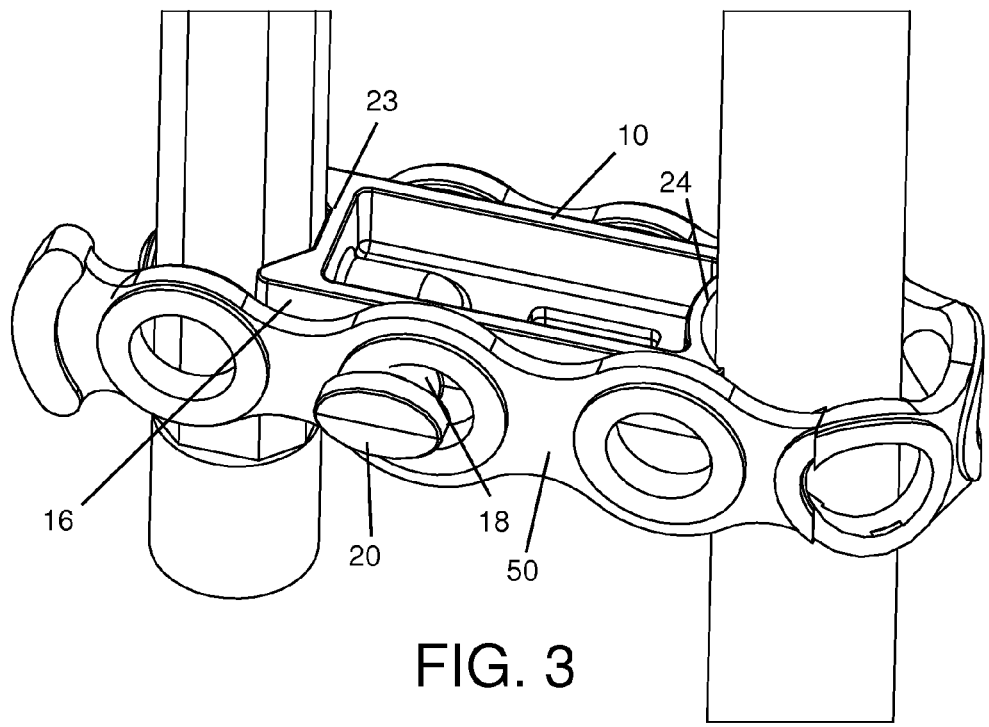
FIG. 3 is a detailed perspective view of an exemplary embodiment of the present invention.
Figure 4:
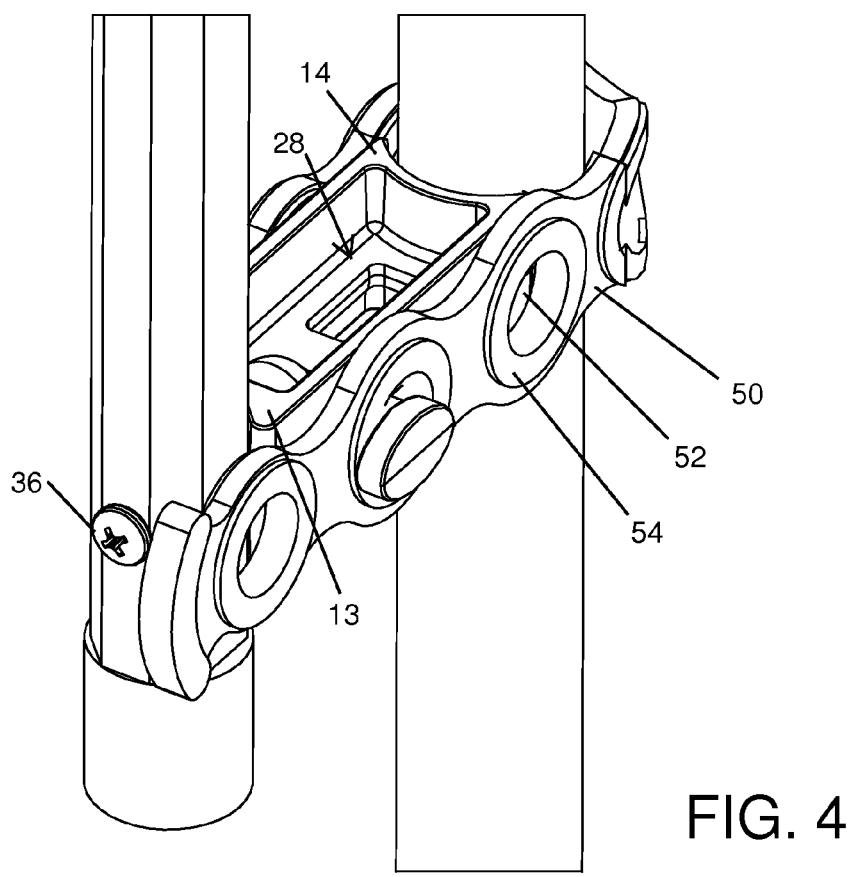
FIG. 4 is a detailed perspective view of an exemplary embodiment of the present invention.
Figure 5:
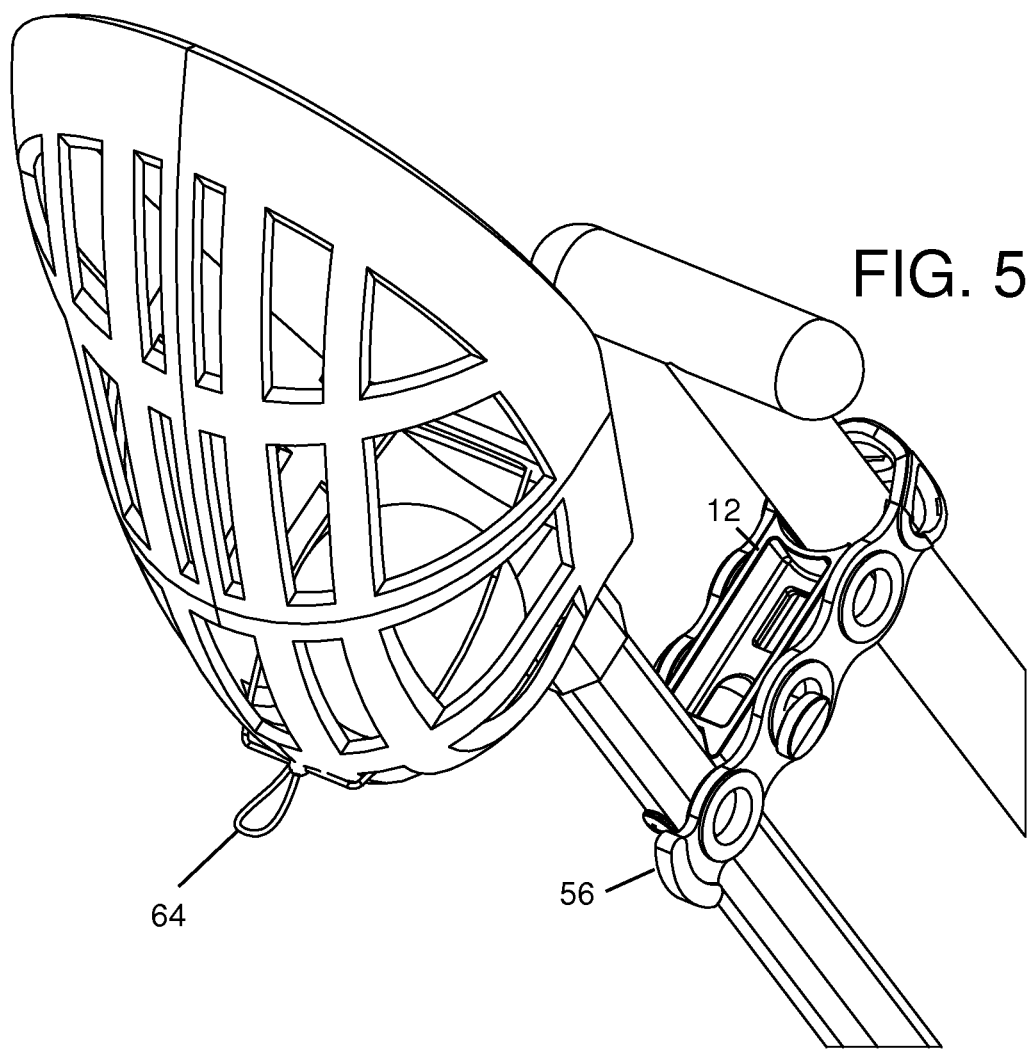
FIG. 5 is a perspective view of an exemplary embodiment of the present invention.
Figure 6:
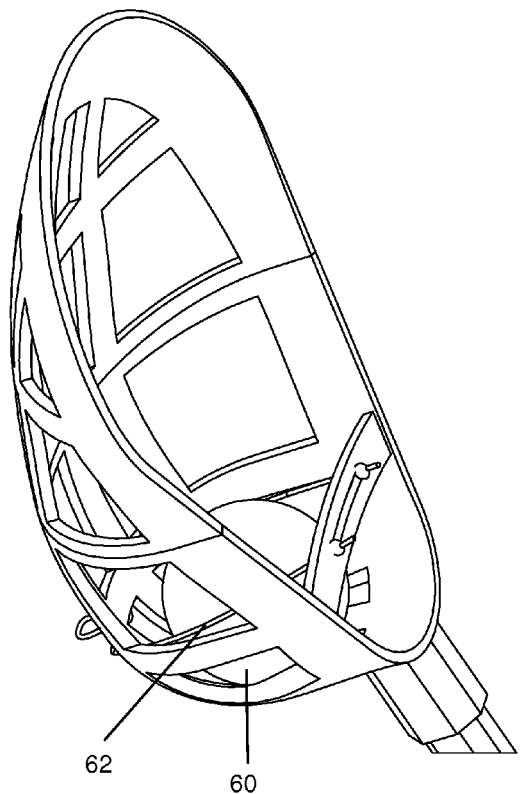
FIG. 6 is a perspective view of an exemplary embodiment of the present invention.
Figure 7:
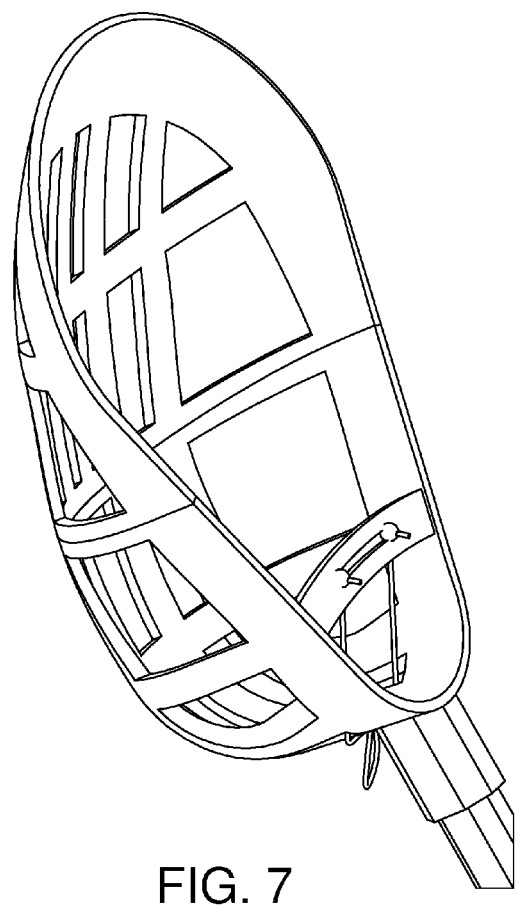
FIG. 7 is a perspective view of an exemplary embodiment of the present invention.

Referring to FIGS. 1 through 7, the present invention may include a removable paddle attachment assembly 100. The attachment assembly 100 may include at least one attachment bracket 10 and at least one attachment strap 50 adapted to removably attach an activity device 30 to a propulsion implement 40. Each attachment bracket 10 may be made of material that can be repeatedly and reliably used without failure, such as various impregnated or laminated fibrous materials, various plasticized materials and the like, suitable for functioning in accordance with the present invention as described herein. Each attachment strap 50 may be made of resilient material that can be repeatedly stretched without fracturing, such as rubber, suitable for functioning in accordance with the present invention as described herein.

The propulsion implement 40 may have an elongated body portion 42 terminating in a functional portion 44, so as to be adapted for propelling a watercraft. The propulsion implement 40 may include but not be limited to paddles for kayaking, paddle boards, canoeing, gondolas, and the like. The functional portion 44 may be a paddle blade, in some embodiments. In certain embodiments, the propulsion implement 40 may be a paddle terminating in a blade 44 on one end and a handle on the other opposing end.

The activity device 30 may include, but not be limited to training hardware or sport hardware. The sport hardware may include, but not be limited to, a lacrosse stick, a racquetball racket, a bat, or the like. The training hardware may include, but not be limited to, a net, a flag, a weighted bar, a water bottle or the like. The activity device 30 may include an attachable portion 32 and an activity portion 34. By way of example, the activity portion 34 of the lacrosse stick would include the lacrosse head and basket, while the attachable portion 32 would include the shaft or stick. In certain embodiments, the activity portion 34 may include a floating ball 60 and a ball retention strap 62.

Each attachment bracket 10 may include an elongated body 12 terminating in an activity end 13 and an opposing handle end 14. The body 12 may have two opposing periphery surfaces 16 defining lateral sides of the body 12 as it extends between its two opposing ends 13, 14. At least one attachment strap cleat 18 may be perpendicular joined along the periphery surfaces 16. Each cleat 18 may form a cleat head 20 perpendicularly joined to its distal end. The body 12 between the opposing periphery surfaces 16 may form at least one cutout 28 so as to reduce the weight of said body 12 and minimize any collection of water.

Each activity and handle end 13, 14 may form a corresponding activity and handle saddle 23, 24 dimensioned and adapted to snugly engage a portion of the attachable portion 32 of the activity device 30 and a portion of the body portion 42 of the propulsion implement 40, respectively. The activity saddle 23 may be mounted to the attachable portion 32 by a fastener 36 or otherwise clamped or held in position. The fastener 36 may connect the attachable portion 32 to the activity saddle 23 so that the activity saddle 23 need not circumscribe the attachable portion 32. Likewise, the handle saddle 24 may be dimensioned and adapted to engage only a portion of a periphery of the body portion 42. The periphery may be generally circular, oval rectangular or any geometrical or non-geometrical shape suitable for that of a profile of the body portion 42 of the propulsion implement 40. In certain embodiments, a profile of the handle saddle 40 may be semi-circular or feature a high friction surface to minimize any slipping of the handle relative to the saddle.

A plurality of spaced-apart strap holes 52 may be formed along the length of each attachment strap 50. Each attachment strap hole 52 may be adapted to removably receive and secure a attachment strap cleat 18 and its cleat head 20. Each strap hole may be reinforced by a grommet 54. Each attachment strap 50 may be dimensioned and adapted to extend from one periphery surface 16 (to which it may be attached) across the handle saddle 24 and over the other opposing periphery surface 16 so as to sandwich the portion of the body portion 42 of the propulsion implement 40 against the handle saddle 24. As a result, a user may removably attach body portions 42 of different sizes and shapes to each attachment bracket 10. In certain embodiments, the attachment strap 50 may be removably/adjustably attached to the one periphery surface 16 by a attachment strap hole 50 engaging a attachment strap cleat 18 (not shown). In an alternative embodiment, the attachment may be fixed. Each strap 50 may terminate in a strap handle 56 adapted for manually manipulating the strap 50 while stretching it.

A method of using the present invention may include the following. The attachment assembly 100 disclosed above may be provided. A user may securely engage the portion of the body portion 42 of a preferred propulsion implement 40 against the handle saddle 24, and then the user may stretch the attachment strap 50 from one from one periphery surface 16, sandwiching the portion of the body portion 42 to the handle saddle 24, and over to the other opposing periphery surface 16 where a strap holes 52 may engage the cleat 18 for a desired tightness/grip about the portion of the body portion 42. This way the attachment is easily made and removed, and the snugness of said attachment is also adjustable, and made effective by interfacing with the pair of opposing peripheral surfaces of the elongated body 12. Moreover, the activity device 30 can extend beyond the body portion 42 of the propulsion implement 40, so that the propulsion implement 40 is not compromised in terms of performance, functionality, paddling techniques, and the like. In other words, a distance from a distal end of the activity portion to the two attachment brackets is greater than a distance from a distal end of an attached watercraft paddle.

The portion of the body portion 42 engaged may be chosen/disposed at various locations along the body portion 42 depending on the predetermined training or game-playing activity will be involved. Such adjustable disposition enables the user to avoid impairing the performance and functionality of a preferred propulsion implement 40; specifically, paddling correctly. When attached properly the user with be able to hold the body portion 42 correctly with the activity device 30 attached to the other side of the preferred propulsion implement 40.

In certain embodiments, two attachment brackets/attachment straps 10/50 may be used to secure one activity device 30 to the propulsion implement 40. In certain embodiments, each activity saddle 23 may be pre-mounted to the attachable portion 32 by the fastener 36 or other securing means. In certain embodiments, the user may position their paddle 40 on the ground, with the blade 44 be angled up allowing the shaft 42 to be flush to the ground, and position the activity device 30 so that the attachment straps 50 wrap around the shaft 42 and the head of the activity device 30 is not blocked by the handle of the paddle 40. By holding the stick/shaft 42 firmly with one hand and pulling the attachment straps 50 to the cleats 18, the user may check to make sure the stick 42 is secure on their paddle 40.

The user may utilize the convenient ball retention strap 62 when not paddling. The ball retention strap 62 may be oriented in the uppermost position to secure the ball while paddling, or in the downward position to free the basket region when game playing. The ball retention strap 62 may be made of elastic material so as to secure the floating ball 60 within the basket region when paddling. The ball retention strap 62 may be easily moved to another position to expose the basket region of the activity device 30 when desired. A protuberance 64 on the ball retention strap 62 enables the user to easily grasp the cord to change positions.

In a safe area, the user may toss the floating ball 60 in the water, which they may retrieve using the activity device 30 employing a shoulder width grip to scoop it up using the head/basket 34 (activity portion). The user should have a slight bend in your knees and a wide balanced stance. For throwing with a balanced stance, the user may hold their paddle shaft 42 at a shoulder width grip, bringing the head 34 slightly behind your shoulder. Extending their top hand (closest to the activity device 30) forward in the direction—the user may throw or cast the floating ball 60 while pulling their lower hand back towards their body.

Catching may require more skill and practice. The optimal way to catch the ball 60 may be to hold the paddle 40 parallel to your body, with the head 34 of the stick 32 positioned above your shoulder. The user may give a partner a nice target as the ball 60 enters the head 34, bringing the stick 32 back to absorb the catch.

Here are a few games that you can play right when you attach your stick because there is no catching involved. Racing - This is the easiest way to quickly the product. Throw the ball as far as you can and then paddle to retrieve it. Set an arbitrary finish line or course and practice by yourself or race with your friends.

Golf—Turn any body of water into a golf course! Use a Frisbee or Flying Disc (thrown upside down) or a Flying Ring. Toss your ring (which is your "hole") as far as you can. Then "tee off" by throwing your ball in the direction of the "hole," yet another game that can be enjoyed by yourself or with a group. Play for number of strokes, throws, or race to the "hole" to improve your paddling speed!

A Great Game for You and your Dog! If your likes the water you this product can enable you to easily play throw and retrieve! The elastic ball holder makes it easy to stow your ball when you are not playing.

It should be understood, of course, that the foregoing relates to exemplary embodiments of the invention and that modifications may be made without departing from the spirit and scope of the invention as set forth in the following claims.

What is claimed is:

1. An attachment assembly for removably securing an activity device to a watercraft paddle without compromising paddling techniques, comprising:
    at least one attachment bracket, each comprising:
        an elongated body extending in a second direction from an activity end to a handle end;
        at least one hole extending through the elongated body between the activity end and the handle end in a first direction generally perpendicular relative to the second direction;
        a handle saddle formed along the handle end;
        a pair of opposing peripheral surfaces defining a periphery of the elongated body between the activity and handle ends; and
        at least one attachment strap cleat disposed along the pair of opposing peripheral surfaces; and
    an attachment strap for each attachment bracket, each attachment strap forming a plurality of strap holes along its length, wherein the attachment strap is dimensioned to be attached along one surface of the pair of opposing peripheral surfaces and stretch over the handle saddle so as to interface along the opposing surface of the pair of opposing peripheral surfaces, wherein each strap cleat extends in a third direction that is generally perpendicular to both the first and second directions, whereby a portion of the watercraft paddle may be sandwiched between each attachment strap and each handle saddle.

2. The attachment assembly of claim 1, wherein the handle saddle forms a semi-circular profile.

3. The attachment assembly of claim 1, further comprising at least one recessed cutout extending in the second direction along each elongated body, wherein the at least one hole is disposed within the recessed cutout.

4. The attachment assembly of claim 1, further comprising a fastener rigidly connecting the activity device to each activity end.

5. The attachment assembly of claim 1, wherein the attachment strap terminates prior to sandwiching the activity end in the sandwiched condition.

6. The attachment assembly of claim 1, further comprising a floating ball; and wherein the activity device comprises a head.

7. The attachment assembly of claim 6, wherein the head further comprises a ball retention strap dimensioned and adapted to secure the floating ball.

8. The attachment assembly of claim 1, further comprising a reinforcement grommet about each strap hole.

9. The attachment assembly of claim 8, further comprising a strap handle disposed at a terminus of each attachment strap.

10. An attachment assembly for removably securing an activity device to a watercraft paddle without compromising paddling techniques, comprising:
    at least one attachment bracket, each comprising:
        an elongated body extending in a second direction from an activity end to a handle end;
        at least one hole extending through the elongated body between the activity end and the handle end in a first direction generally perpendicular relative to the second direction;
        a handle saddle formed along the handle end;
        a pair of opposing peripheral surfaces defining a periphery of the elongated body between the activity and handle ends; and
        at least one attachment strap cleat disposed along the pair of opposing peripheral surfaces;
    at least one recessed cutout extending in the second direction along each elongated body, wherein the at least one hole is disposed within the recessed cutout; and
    an attachment strap for each attachment bracket, each attachment strap forming a plurality of strap holes along its length, wherein the attachment strap is dimensioned to be attached along one surface of the pair of opposing peripheral surfaces and stretch over the handle saddle so as to interface along the opposing surface of the pair of opposing peripheral surfaces, whereby a portion of the watercraft paddle may be sandwiched between each attachment strap and each handle saddle.

11. The attachment assembly of claim 10, wherein the handle saddle forms a semi-circular profile.

12. The attachment assembly of claim 10, further comprising a fastener rigidly connecting the activity device to each activity end.

13. The attachment assembly of claim 10, wherein the attachment strap terminates prior to sandwiching the activity end in the sandwiched condition.

14. The attachment assembly of claim 10, further comprising a floating ball; and wherein the activity device comprises a head.

15. The attachment assembly of claim 14, wherein the head further comprises a ball retention strap dimensioned and adapted to secure the floating ball.

16. The attachment assembly of claim 10, further comprising a reinforcement grommet about each strap hole.

17. The attachment assembly of claim 16, further comprising a strap handle disposed at a terminus of each attachment strap.

\* \* \* \* \*